United States Patent
Cohen et al.

(10) Patent No.: US 6,173,915 B1
(45) Date of Patent: Jan. 16, 2001

(54) GASEOUS FUEL INJECTOR WITH THERMALLY STABLE SOLENOID COIL

(75) Inventors: James H. Cohen, Virginia Beach; James Paul Fochtman, Williamsburg; Danny Orlen Wright, Cobbs Creek, all of VA (US)

(73) Assignee: Siemens Automotive Corporation, Aubur Hills, MI (US)

(*) Notice: Under 35 U.S.C. 154(b), the term of this patent shall be extended for 0 days.

(21) Appl. No.: 09/370,851

(22) Filed: Aug. 10, 1999

(51) Int. Cl.$^7$ .............................. B05B 1/30; F02M 51/00
(52) U.S. Cl. ...................... 239/585.1; 239/585.4
(58) Field of Search ............................ 239/585.1, 585.4, 239/397.5; 251/129.21; 355/260, 261, 262; 336/90, 96

(56) References Cited

U.S. PATENT DOCUMENTS

| | | | |
|---|---|---|---|
| 3,937,855 | * | 2/1976 | Gruenwald .............................. 427/54 |
| 4,586,017 | * | 4/1986 | Laskaris et al. ..................... 338/32 S |
| 5,301,874 | * | 4/1994 | Vogt et al. ......................... 239/585.1 |
| 5,758,865 | * | 6/1998 | Casey ................................. 251/129.21 |
| 5,915,626 | * | 6/1999 | Awarzamani et al. ................ 239/135 |
| 5,918,818 | * | 7/1999 | Takeda ............................... 239/585.1 |

* cited by examiner

Primary Examiner—Patrick Brinson
Assistant Examiner—Davis Hwu

(57) ABSTRACT

An electromagnetically operable fuel injector for a gaseous fuel injection system of an internal combustion engine, the injector having a generally longitudinal axis, a ferromagnetic core, a magnetic coil at least partially surrounding the ferromagnetic core, and an armature magnetically coupled to the magnetic coil and being movably responsive to the magnetic coil. The armature actuates a valve closing element in the form of a valve needle which interacts with a fixed valve seat of a fuel valve and is being movable away from the fixed valve seat when the magnetic coil is excited. The armature has a generally elongated shape and a generally central opening for axial reception and passage of gaseous fuel from a fuel inlet connector positioned adjacent thereto. The fuel inlet connector and the armature are adapted to permit at least a first flow path of gaseous fuel between the armature and the magnetic coil as part of a path leading to the fuel valve. A thermally conductive material is positioned adjacent the magnetic coil to transfer heat from the magnetic coil to adjacent components to as to render the coil thermally efficient and relatively unaffected by heat generated thereby.

9 Claims, 4 Drawing Sheets

GASEOUS FUEL INJECTOR WITH THERMALLY STABLE SOLENOID COIL

BACKGROUND OF THE INVENTION

1. Field of the Invention

The present application relates to a thermally efficient compressed natural gas injector having improved performance.

2. Description of the Related Art

Compressed natural gas (hereinafter sometimes referred to as "CNG") is becoming a common automotive fuel for commercial fleet vehicles and residential customers. In vehicles, the CNG is delivered to the engine in precise amounts through gas injectors, hereinafter referred to as "CNG injectors". The CNG injector is required to deliver a precise amount of fuel per injection pulse and maintain this accuracy over the life of the injector. In order to maintain this level of performance for a CNG injector, certain strategies are required to help reduce the effects of contaminants in the fuel.

Compressed natural gas is delivered throughout the country in a pipeline system and is mainly used for commercial and residential heating. While the heating systems can tolerate varying levels of quality and contaminants in the CNG, the tolerance levels in automotive gas injectors is significantly lower.

These contaminants, which have been acceptable for many years in CNG used for heating, affect the performance of the injectors to varying levels and will need to be considered in future CNG injector designs. Some of the contaminants found in CNG are small solid particles, water, and compressor oil. Each of these contaminants needs to be addressed in the injector design for the performance to be maintained over the life of the injector.

The contaminants can enter the pipeline from several sources. Repair, maintenance and new construction to the pipeline system can introduce many foreign particles into the fuel. Water, dust, humidity and dirt can be introduced in small quantities with ease during any of these operations. Oxides of many of the metal types found in the pipeline can also be introduced into the system. In addition, faulty compressors can introduce vaporized compressor oils which blow by the seals of the compressor and enter into the gas. Even refueling can force contaminants on either of the refueling fittings into the storage cylinder. Many of these contaminants are likely to reach vital fuel system components and alter the performance characteristics over the life of the vehicle.

In general, fuel injectors require extremely tight tolerances on many of the internal components to accurately meter the fuel. For CNG injectors to remain contaminant tolerant, the guide and impact surfaces for the armature needle assembly require certain specifically unique characteristics.

In addition to fuel continuation problems using CNG the fuel injectors inherently present additional problems. For example, problems inherent to generation of heat in the solenoid coil are particularly aggravated in fuel injectors using CNG as will be explained hereinbelow.

The CNG (Compressed Natural Gas) injector is required to open and close very quickly to promote efficient fuel consumption. In order to accomplish this objective effectively the magnetic circuit utilized to open the value needle must produce a magnetic field—or flux—relatively quickly across the working gap between the fuel inlet connector and the armature. The CNG injector has a magnetic circuit consisting of an inlet connector, armature, valve body shell, housing and a coil. When energized, the coil produces a magnetic field which is conducted through the magnetic circuit. The flux is conducted through the components and creates an attractive force at the working gap, which force causes upward movement of the armature, with consequent upward movement of the valve needle to open the injector valve.

The CNG injector is required to open and close very quickly. This quick opening creates a relatively severe impact between the armature and the inlet connector. In the CNG injector, the factors which effect impact velocity between the armature and inlet connector are more severe then in a gasoline injector. Compared to a gasoline injector, the CNG injector has two to three times the lift, less spring preload and similar force required to open the injector. The difference is then exaggerated by the lower velocity (CNG) fluid then gasoline.

A CNG injector requires a much higher flow rate and area to obtain the same amount of energy flow through the injector in a given pulse. This is caused by the lower density of the gaseous CNG when compared to standard gasoline. This requires that the lift for a CNG injector be much greater than it is for a gasoline injector.

The increased lift creates several problems. First, the increased lift substantially reduces the magnetic force available to open the injector. Second, the velocities created because of the longer flight times can be higher, creating higher impact momentum. The reduction in magnetic force also creates another problem. This reduction in force requires the use of a lighter spring preload than in a standard gasoline injector.

In addition, with CNG, greater volumes of fuel are made to pass through the injector with increased demands on the solenoid coil and with of excessive heat which adversely affects the temperature and performance of the solenoid. Also, gaseous fuels have a lower specific heat than liquid fuels and thereby tend to conduct less heat away from the solenoid coil. We have invented a fuel injector suitable for use with compressed natural gas which conducts heat from the magnetic solenoid coil to the adjacent components so as to improve performance.

SUMMARY OF THE INVENTION

An electromagnetically operable fuel injector for a gaseous fuel injection system of an internal combustion engine is disclosed, the injector having a generally longitudinal axis, which comprises a ferromagnetic core, and a magnetic coil at least partially surrounding the ferromagnetic core. An armature is magnetically coupled to the magnetic coil and is movably responsive to the magnetic coil, the armature actuating a valve closing element which interacts with a fixed valve seat of a fuel valve and being movable away from the fixed valve seat when the magnetic coil is excited. The armature has a generally elongated shape and a generally central opening for axial reception and passage of gaseous fuel from a fuel inlet connector positioned adjacent thereto. The fuel inlet connector and the armature is adapted to permit a first flow path of gaseous fuel between the armature and the magnetic coil as part of a path leading to the fuel valve. A thermally conductive material is positioned adjacent the magnetic coil to transfer heat from the magnetic coil to adjacent components. Preferably, the thermally conductive material is a thermally conductive plastic material such as nylon. The nylon is filled with reinforcing glass fibers. The glass fiber reinforced nylon is essentially in the form of a cylindrical sleeve about one millimeter (1 mm) in wall thickness and about 5–6 millimeter (mm) in length.

BRIEF DESCRIPTION OF THE DRAWINGS

Preferred embodiments of the invention are described hereinbelow with reference to the drawings wherein.

DESCRIPTION OF THE PREFERRED EMBODIMENTS

Figure 1:
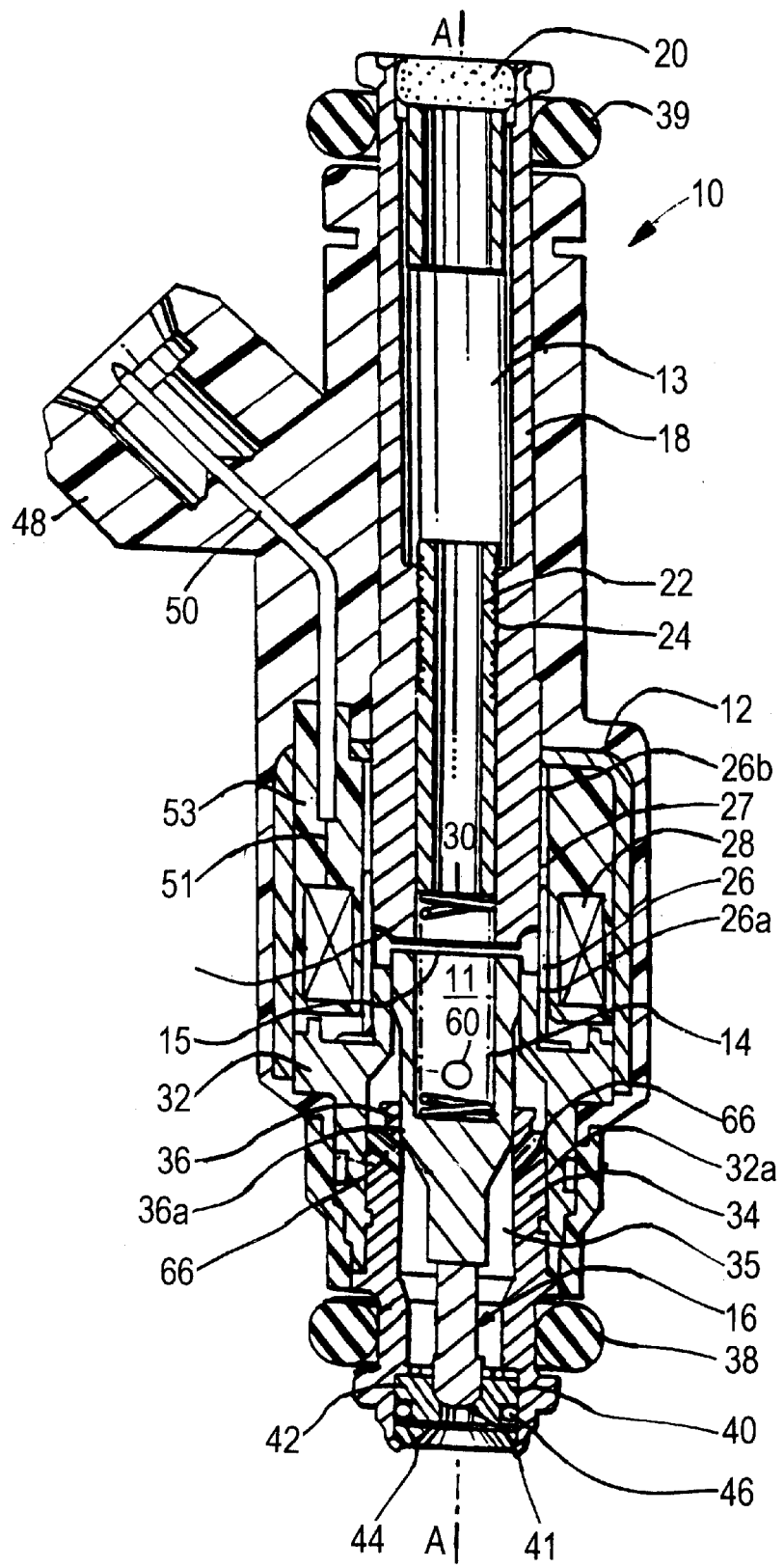
FIG. 1 is an elevational view, partially in cross-section, of a preferred embodiment of a compressed natural gas injector constructed according to the invention.

Referring initially to FIG. 1 there is shown a CNG injector 10 which is constructed according to the present invention. Injectors of the type contemplated herein are described in commonly assigned U.S. Pat. No. 5,494,224, the disclosure of which is incorporated by reference herein. Injectors of this type are also disclosed in commonly assigned copending applications; U.S. application Ser. No. 09/320,178, filed May 26, 1999, entitled Contaminant Tolerant Compressed Natural Gas Injector and Method of Directing Gaseous Fuel Therethrough, and U.S. application Ser. No. 09/320,176, filed May 26, 1999, entitled Compressed Natural Gas Injector Having Improved Low Noise Valve Needle, the disclosures of which are incorporated herein by reference. Other commonly assigned, copending applications include U.S. application Ser. No. 09/320,177, filed May 26, 1999, entitled Compressed Natural Gas Injector with Gaseous Damping for Armature Needle Assembly During Opening, U.S. application Ser. No. 09/320,175, filed May 26, 1999, entitled Gaseous Injector with Columnated Jet Orifice Flow Directing Device and U.S. application Ser. No. 09/320,179, filed May 26, 1999, entitled Compressed Natural Gas Injector Having Magnetic Pole Face Flux Director, the disclosures of which are also incorporated herein by reference.

The injector 10 includes housing 12 containing armature 14 to which valve needle 16 is attached by crimping. Fuel inlet connector 18 includes central fuel flow opening 13 and CNG filter 20 at the upper end portion of opening 13 as shown. The fuel inlet connector 18 also includes adjusting tube 22 connected thereto at 24 by a known crimping procedure. Housing 12 includes inner non-magnetic shell 26 which surrounds the inlet connector 18 and armature 14 having central fuel flow opening 11 as shown. Armature 14 and inlet connector 18 define with housing 12, an enclosure for solenoid coil 28 which is selectively energized to move armature 14 and needle 16 upwardly to open the valve aperture 41, and selectively deenergized to permit armature 14 and needle 16 to return to the "closed valve" position as shown, under the force of coil spring 30. Fuel flow into the injector begins at filter 20 and passes through fuel inlet connector 18, to armature 14, and ultimately to valve aperture 41 of valve seat 40 into the intake manifold of the engine (not shown).

Figure 2:
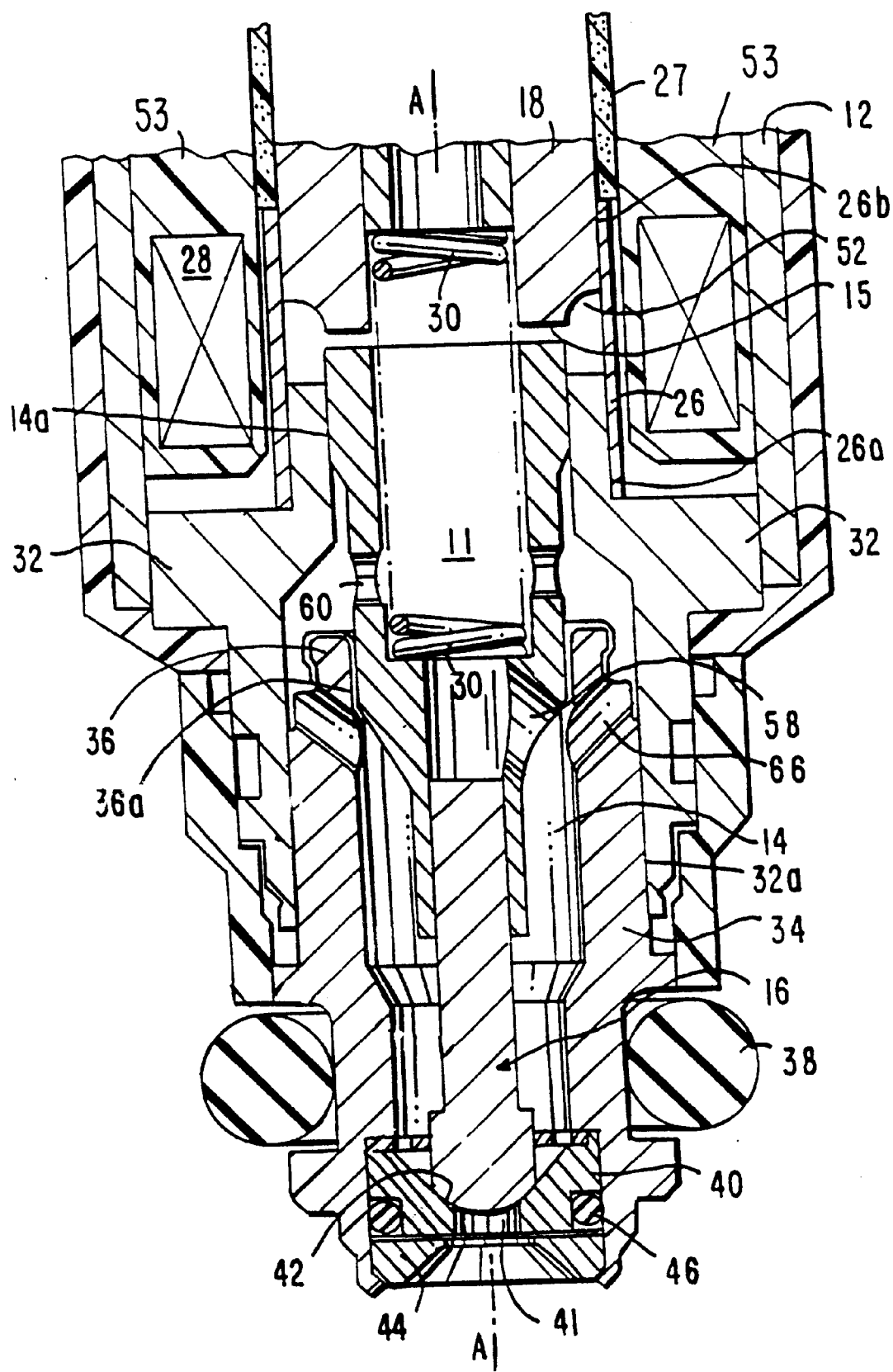
FIG. 2 is an enlarged elevational cross-sectional view of the lower portion of the injector of FIG. 1, showing the improved heat conducting sleeve which surrounds the lower portion of the fuel inlet connector in the area adjacent to the magnetic coil.

Referring further to FIG. 1 in conjunction with FIG. 2, valve body shell 32, which is made of a ferromagnetic material and which forms part of a magnetic circuit, surrounds valve body 34 and has at the upper end, upper guide 36 as shown. Space 36a between upper guide 36 and armature 14 is about 0.010 to about 0.015 mm on the diameter, and permits guiding movement of armature 14. Lower O-rings 38 provide sealing between the injector 10 and the engine intake manifold (not shown) and upper O-rings 39 provide sealing between the injector 10 and the fuel rail (also not shown). Valve body 34 defines central fuel flow opening 35.

In FIG. 2, valve body shell 32 is attached to valve body 34, preferably by weld 32a, and at the upper end by weld 26a, to non-magnetic shell 26. Non-magnetic shell 26 is in turn welded to fuel inlet connector at 26b. Thus, fuel flowing from fuel inlet connector 18 across working gap 15 must flow through the clearance space 14a between armature 14 and valve body shell 32 which is also provided to permit upward and downward movement of armature 14. The space 14a is approximately 0.10 to 0.30 mm on the diameter.

Referring again to FIGS. 1 and 2, valve seat 40 contains a valve orifice 41 and a funnel shaped needle rest 42 having a frusto-conical cross-sectional shape. The valve seat 40 is maintained in position by back-up washer 44 and sealed against fuel leakage with valve body 34 by O-ring 46. Overmold 48 of suitable plastic material such as nylon supports terminal 50 which extends into coil 28 and is connected via connection 51 to provide selective energization of the coil to open the valve by raising the armature 14 and valve needle 16 against the force of spring 30. Coil 28 is surrounded by dielectric plastic material 53 as shown in the Figs.

In injectors of this type, the interface space 15 (or working gap 15) between the inlet connector and the armature is extremely small, i.e., in the order of about 0.3 mm (millimeters), and functions relatively satisfactorily with conventional fuels which are relatively free of contaminants such as water, solids, oil, or the like, particularly after passing through a suitable fuel filter. Accordingly, when the two surfaces surrounding space 15 are in such intimate contact that the atmosphere between them is actually displaced in relatively significant amounts, atmospheric pressures acting on the two members actually force the two surfaces together. Any liquid contaminant present at the armature/inlet connector interface would allow for the atmosphere to be displaced, thereby adversely affecting the full and free operation of the armature/needle combination.

When known injectors, which functioned at relatively acceptable levels with relatively clean conventional fuels, were utilized with CNG, impurities such as oil or water at the inlet connector/armature interface produced a force of about 16.5 Newtons holding the armature to the inlet connector. In comparison, the force provided by spring 30 is in the order of about 3 Newtons, thus fully explaining the erratic closing of the armature/valve needle when the fuel utilized with known injectors is CNG. In particular, the 16.5 Newton force holding the inlet connector and armature together is due to the fact that the fuel operating pressure within the injector is about 8 bar (i.e. 8 atmospheres) and this force of about 16.5 Newtons acts across the lower surface area of the inlet connector 18, which is about 21 square millimeters (i.e. mm²). Thus a relatively minor slick of oil or other impurity within space 15 of a known injector will cause the inlet connector and the armature to become temporarily attached to each other, particularly due to the 8 bar pressure acting on the remaining surfaces of the inlet connector and armature. As noted, the tendency for the armature to become attached to the inlet connector results in erratic valve closing.

Figure 3:
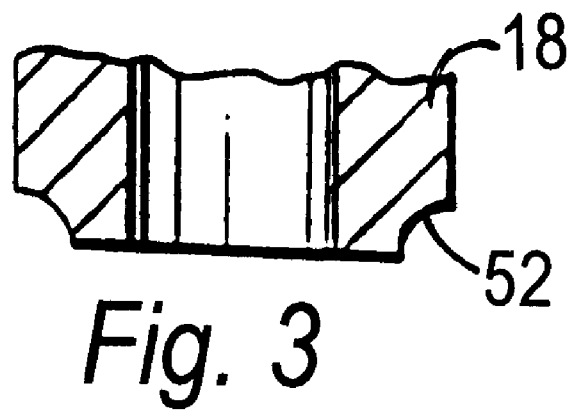
FIG. 3 is a partial elevational cross-sectional view of the lower end portion of the fuel inlet connector of the injector shown in FIG. 1.

The present injector eliminates the aforementioned erratic valve closing and improves the operation of the injector with gaseous fuels. In FIG. 3, the lower end portion of inlet connector 18 is configured as shown by the arcuately chamfered end 52. This configuration provides a beneficial effect in that it directs and orients the magnetic field across the working gap 15 in a manner which optimizes the useful magnetic force created for moving the armature through the working gap. This feature is disclosed in commonly assigned application entitled Compressed Natural Gas Fuel Injector Having Magnetic Pole Face Flux Director, the disclosure of which is incorporated herein by reference. Additional features are disclosed in commonly assigned copending applications entitled Compressed Natural Gas Injector with Damping for Armature Needle Assembly during Opening, the disclosure of which is incorporated herein by reference.

Figure 4:
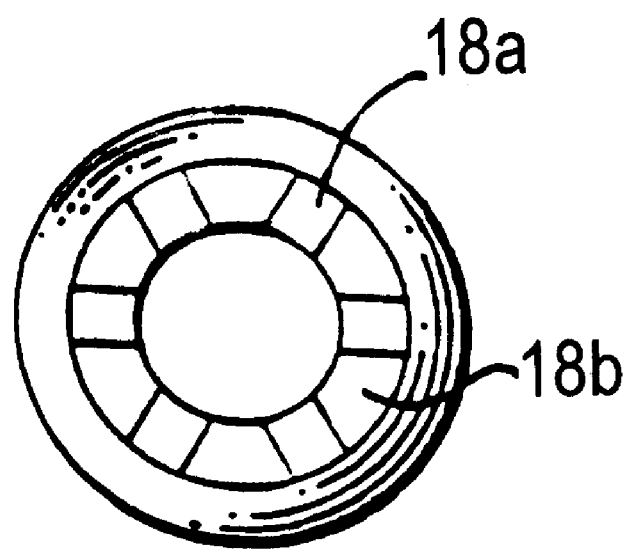
FIG. 4 is a plan view of the bottom surface of the preferred fuel inlet connector shown in FIG. 1.

In addition, as shown in FIG. 4, radial slots in the for of recessed surfaces 18a are provided in the lowermost surface of inlet connector 18 to reduce the effective contact surface area between the armature and the inlet connector by about one third of the total cross-sectional area which was utilized in prior art conventional injectors. This configuration provides six coined pads 18b of about 0.005 mm in height, thus creating six corresponding rectangular shaped radial slots 18a to provide fuel flow paths. By reducing, the effective surface area of the lowermost face of the inlet connector 18 as shown, the tendency to develop an attractive force between the inlet connector 18 and the armature 14 is significantly reduced to about one-third of its original valve, and the ability to tolerate fuel contaminants at the interface without producing an attractive force therebetween is also significantly increased. As noted, preferably, the rectangular radial slots 18a are of a shallow depth, i.e. about 0.05 mm, (i.e., millimeters) in order to provide the benefit of reducing the inlet connector/armature interface surface area while still providing a relatively unobtrusive location for collection of solid contaminants which are ultimately removed by the flow of gaseous CNG.

As noted, the provision of recessed surfaces 18a in the lowermost surface of inlet connector 18 creates raised pads 18b on the surface, which pads improve the tolerance of the injector to fuel contaminants in several ways. The recessed surfaces 18a may be made by any suitable process, but are preferably coined. The first effect is to reduce the contact area of the inlet connector at the armature interface, thereby significantly reducing any attractive force generated therebetween by liquid contaminants such as oil or water. Furthermore, as noted, the radial pads 18b provide hidden areas between the pads where contaminants can collect without affecting the operative working gap 15 until being drawn away by the fuel flow. The working gap for gasoline is about 0.08 mm to about 0.14 mm and about 0.3 mm for compressed natural gas. In addition, as noted, the provision of the six rectangular recessed portions in the form of slots 18a and six raised pads 18b, each having a generally trapezoidal shape, on the inlet connector, provide a unique fuel flow path past transversely through the working gap 15 as shown at 56 in FIG. 5 and allow for the control of the fuel flow around and through the armature by controlling the pressure losses.

Also, by controlling the sizes of the recessed surfaces 18a and raised pads 18b, and the various apertures 58, 60, 66 in the armature and the valve body as will be described—as well as the numbers and combinations of such openings—the fuel flow can be controlled over at least three flow paths and pressure losses can also be controlled. For example, a small pressure differential across the armature while fully open, assists spring 30 during breakaway upon closing and provides dampening on opening impact. The additional fuel flow path also reduces the possibility of contaminants collecting above upper guide 36 as shown in FIG. 2. In summary, numerous combinations of apertures and sizes thereof—as well as slots and pads on the fuel inlet connector—can be made to direct the gaseous fuel flow in any desired manner which is best for optimum fuel burning and engine application.

Figure 5:
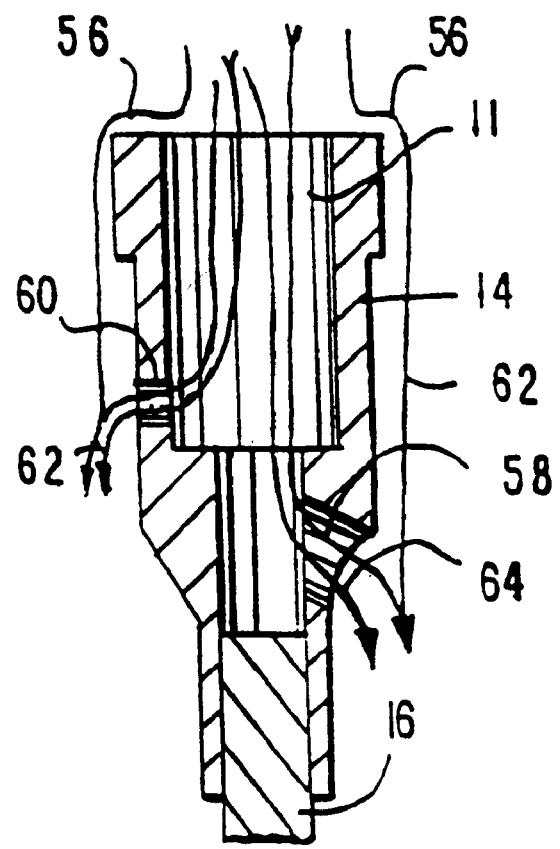
FIG. 5 is an elevational cross-sectional view of a preferred embodiment of the armature shown in FIG. 1 and illustrating the improved fuel flow paths resulting therefrom.
Figure 6:
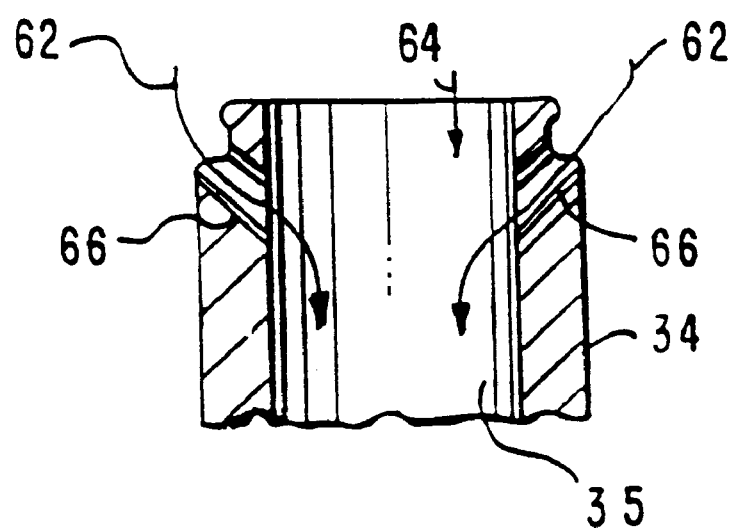
FIG. 6 is an elevational cross-sectional view of the upper portion of a preferred embodiment of the valve body shown in FIG. 1.

Referring now to FIGS. 5 and 6 in conjunction with FIGS. 1–3, there is illustrated still another significant improvement which renders the present fuel injector assembly more fully capable of operation with CNG. In injectors which were used with relatively contaminant free liquid fuels the fuel would pass through the filter down through the inlet connector into the armature and out an opening positioned relatively close to the lowest portion of the armature and out an opening positioned relatively close to the lowest portion of the armature which was located substantially immediately above the valve aperture. In the present structure there is provided a relatively diagonally oriented aperture 58 in the armature as shown in FIG. 5, which directs the CNG flow therethrough and downwardly toward valve aperture 41 for entry into the intake manifold of the internal combustion engine.

As shown in FIG. 5, aperture 58 forms a generally acute angle with longitudinal axis A—A of the fuel injector 10. In addition, the armature of the present invention provides at least one side opening 60 which is generally transverse to the longitudinal axis A—A, to permit fuel flowing downwardly through the center of the armature to be directed sidewardly out of the armature and thereafter downwardly toward the valve aperture 41 shown in FIG. 1. In the embodiment shown in FIG. 1, aperture 60 is generally horizontal, but may be oriented at an acute angle to the longitudinal axis if desired. Aperture 58 is not shown in the cross-sectional view of armature 14 in FIG. 1. The fuel flowing through aperture 60 is indicated by the flow lines 62 and the fuel flowing through aperture 58 is indicated schematically by flow lines 64. Optionally several additional horizontal apertures 60 may be provided in the armature at different radial locations thereabout, or alternatively as shown, one aperture 60 may be provided, depending upon the fuel flow pattern sought in each particular instance. It can be seen that the fuel flow from the fuel inlet connector 18 is divided into three paths, a first path expanding across working gap 15, a second path through aperture(s) 60, and a third path through aperture(s) 58. The first path extends between the armature 14 and the magnetic coil 28 and is ultimately joined by the second flow path passing through aperture(s) 60.

It can also be readily appreciated that the diameters of each aperture 58, 60 can be varied to direct the fuel flow in any predetermined desired direction. For example, by reducing the size of apertures 58, 60 fuel will be encouraged to flow with increased volume cross the working gap 15. Alternatively, increasing the diameter of apertures 58, 60 will attract greater volume of fuel through those apertures and thereby reduce the fuel flow across the working gap. It has also been found that the diameters of the apertures 58, 60 and the numbers and locations of such apertures affect the damping characteristics of the valve needle 16, both upon opening and upon closing. Accordingly, the diameter of fuel flow apertures 58, 60 and the numbers, locations, and orientations of such apertures will depend upon the desired volumetric flow characteristics and desired flow patterns in each instance; however diameters within the range of 1–2 mm have been found to be preferable.

Referring now to FIG. 6, a valve body 34 is also provided with central fuel flow opening 35 and several diagonally oriented fuel path apertures 66 which are intended to receive the CNG fuel flowing from the first and second flow paths from the working gap 15 and aperture(s) 60 along the sides of the armature 14 and to redirect the fuel downwardly toward the valve aperture 41. When the needle 16 is lifted, the fuel is permitted to enter aperture 41 and thereafter directed into the intake manifold of the engine, which is not shown in the drawings. Fuel flowing along the third flow path through aperture(s) 58 lead directly toward aperture 41. It has been found that the unique provisions of the apertures 58 and 60—as well as rectangular radial slots 18*a* on the inlet connector lowermost face—create a fuel flow pattern which induces the CNG to flow in the manner shown by the fuel flow lines at 56, 61 and 64 in FIG. 5 and such fuel flow lines actually create ideal pressure conditions to avoid causing the armature to be attracted to the inlet connector. Thus the attractive forces between the armature and inlet connector are minimized by the several factors mentioned, namely the elimination of the tendency of the oil and contaminates to accumulate in the space 15 located between the armature and the inlet connector, the reduction of the effective inlet connector/armature interface area by provision of radial pads on the face of the inlet connector, and the provision of the unique CNG flow pattern which creates a force free environment between the inlet connector and the armature.

As indicated, alternatively, apertures 60 may be provided in several locations about the circumference of the armature, and apertures 58 may be provided in several locations thereabout. Also their angular orientations may be varied. However, it has been found that a single aperture on each side, as shown is sufficient to produce the desired flow path and the force free environment. Also, as noted, it should be noted that the diameter of each aperture can be altered in order to provide control of the fuel pressures and flow patterns in the areas surrounding the inlet connector, the armature, and the valve body, so as to provide a predetermined fuel flow pattern throughout the injector as may be desired. This feature is more fully disclosed in the aforementioned commonly assigned, copending application entitled Compressed Natural Gas Injector Having Gaseous Damping for Armature Needle Assembly During Opening.

It should also be noted that the presence of the diagonally oriented fuel flow apertures 66 in valve body 34 eliminates the problems of prior art injectors wherein debris and contaminants would accumulate in the area of the upper valve guide 36, causing abrasive action and intermittent guidance between the upper guide 36 and the armature 14. Thus, the provision of the diagonally oriented apertures 66 in valve body 34 encourage the flow of CNG past the area surrounding the upper guide 36 and eliminate any accumulation tendencies for contaminants in the area of upper guide 36.

Referring again to FIGS. 1 and 2, Solenoid coil 28 is generally separated from the fuel inlet connectors by a non-magnetic shell 26 which is positioned within the space provided between the solenoid coil 28, the dielectric material 53, and the fuel inlet connector 18. However, prior to the present invention the space immediately above the non-magnetic shell 26 was devoid of any filler material.

Since the volume of compressed natural gas passing through a fuel injector is significantly greater than the equivalent volume of liquid fuels (for an equivalent amount of energy) passing through liquid fuel injectors, the solenoid coil 28 tends to undergo increased activity with the result that greater amounts of heat are produced in the area surrounding the solenoid. Furthermore, compressed natural gas tends to remove less heat than comparable amounts of liquid fuels due to a lower specific heat factor.

According to the present invention, the annular space located between the upper portion of the solenoid coil enclosure and dielectric plastic material 53 and the fuel inlet connector 18 is filled with a thermally conductive material which assists in conducting heat from the solenoid coil 28 to the non-magnetic shell 26 and the fuel inlet connector 18. Thereafter the heat is carried out of the injector by the compressed natural gas and the surrounding components. The effect of the provision of such heat conducting material between the solenoid coil 28 and the fuel inlet connector 18 is to reduce coil heat and thereby minimize the effects of the coil temperature and to promote increased performance and efficiency. Further, such heat conducting material can be provided in any spaces in the area generally adjacent the solenoid coil. Although any suitable thermally conductive appropriate material may be used, any type of plastic material, preferably nylon material 27 having a 30 percent (%) glass fiber matrix as a reinforcing filler as shown, is incorporated in the space provided. Other suitable reinforcing filler materials are contemplated. Also, other suitable heat conductive materials, including other polyamides may be used. In FIGS. 1 and 2, the plastic sleeve 27 is shown in cross-section, with schematic representation of a glass fiber filler as indicated by the dots in these Figs.

Typically, non-magnetic shell 26 is preferably of stainless steel, is about one millimeter (1 mm) in thickness and is about seven millimeters (7 mm) in length. The glass fiber reinforced nylon material 27 (or nylon "sleeve") is typically cylindrically shaped, is about one millimeter (1 mm) in thickness and about 5–6 millimeters (mm) in length.

Although the invention has been described in detail with reference to the illustrated preferred embodiments, variations and modifications may be provided within the scope and spirit of the invention as described and as defined by the following claims.

What is claimed is:

1. An electromagnetically operable fuel injector for a gaseous fuel injection system of an internal combustion engine, said injector having a generally longitudinal axis, which comprises:
    a) a ferromagnetic core;
    b) a magnetic coil at least partially surrounding the ferromagnetic core;
    c) an armature magnetically coupled to said magnetic coil and being movably responsive to said magnetic coil, said armature actuating a valve closing element which interacts with a fixed valve seat of a fuel valve and being movable away from said fixed valve seat when said magnetic coil is excited, said armature having a generally elongated shape and a generally central opening for axial reception and passage of gaseous fuel from a fuel inlet connector positioned adjacent thereto, said fuel inlet connector and said armature being adapted to permit a first flow path of gaseous fuel between said armature and said magnetic coil as part of a path leading to said fuel valve; and d) a thermally conductive material positioned adjacent said magnetic coil to transfer heat from said magnetic coil to adjacent components.

2. The electromagnetically operable fuel injector according to claim 1, wherein said thermally conductive material is a thermally conductive plastic material.

3. The electromagnetically operable fuel injector according to claim 2, wherein said thermally conductive plastic material is nylon.

4. The electromagnetically operable fuel injector according to claim 3, wherein said nylon is filled with glass fibers.

5. An electromagnetically operable fuel injector for a compressed natural gas fuel injection system of an internal combustion engine, said injector having a generally longitudinal axis, which comprises:

a) a magnetic coil;

b) an armature coupled to said magnetic coil and movably responsive to said magnetic coil, said armature having a first upper end face and a lower end portion;

c) a valve closing element connected to said lower end portion of said armature and interactive with a fixed valve seat to selectively permit fuel to pass through said valve seat as said valve closing element is moved to a valve open position by said armature;

d) a fuel inlet connector having a ferromagnetic portion at least partially surrounded by said magnetic coil, said fuel inlet connector extending in a generally longitudinal direction above said armature and defining a path for fuel to enter said inlet connector and to be directed toward said armature, said fuel inlet connector having a lowermost end portion having a lowermost surface spaced above said armature to define a working gap through which said armature is movable;

e) said armature having a fuel reception portion for receiving fuel directed from said fuel inlet connector, said armature further defining a generally axial fuel passage for directing fuel from said fuel inlet connector toward said fixed valve seat for entry into an air intake manifold of the engine; and f) a thermally conductive material at least partially surrounding said fuel inlet connector in the area adjacent to said magnetic coil to transfer heat from said magnetic coil to said fuel inlet connector, said thermally conductive material being spaced axially with respect to the longitudinal axis from said armature.

6. The electromagnetically operable fuel injector according to claim 5, wherein said thermally conductive material is glass filled plastic material.

7. The electromagnetically operable fuel injector according to claim 6, wherein said glass filler is comprised of glass fibers.

8. An electromagnetically operable fuel injector for a gaseous fuel injection system of an internal combustion engine, said injector having a generally longitudinal axis, which comprises:

a) a magnetic coil;

b) an armature magnetically coupled to said magnetic coil and being movably responsive to said magnetic coil, said armature actuating a valve closing element which interacts with a fixed valve seat of a fuel valve and being movable away from said fixed valve seat when said magnetic coil is excited, said armature having a generally elongated shape and a generally central opening for axial reception and passage of gaseous fuel;

c) a fuel inlet connector having a ferromagnetic portion at least partially surrounded by said magnetic coil, said fuel inlet connector extending in a generally longitudinal direction above said armature and defining a path for fuel to enter said inlet connector and to be directed toward said armature, said fuel inlet connector having a lowermost end portion having a lowermost surface spaced above said armature to define a working gap through which said armature is movable, said fuel inlet connector having a lower surface portion having a continuous annular surface having a circular shape;

d) a non-magnetic shell at least partially surrounding a lower portion of said fuel inlet connector and an upper portion of said armature adjacent said magnetic coil; and e) a thermally conductive glass filled plastic material sleeve positioned adjacent said non-magnetic shell and surrounding said fuel inlet connector to conduct heat from said magnetic coil to said fuel inlet connector and said non-magnetic shell.

9. An electromagnetically operable fuel injector for an internal combustion engine, said injector defining a generally longitudinal axis, which comprises:

a) an outer hosing;

b) a fuel inlet connector positioned in the upper end portion of said outer housing, said fuel inlet connector having an uppermost end portion for reception of fuel therein and a lowermost end portion for discharge of fuel therefrom;

c) an armature positioned below said fuel inlet connector and defining a generally axial elongated central opening to receive fuel flow from said fuel inlet connector, said armature having an uppermost end portion positioned below said lowermost end portion of said fuel inlet connector to define a working gap, and a lowermost end portion having a valve closing element positioned thereon for interaction with a fixed valve having a fixed valve seat associated with said housing to selectively permit fuel to flow through a valve aperture associated with said fixed valve seat when said armature is selectively moved upwardly toward said fuel inlet connector;

d) said fuel inlet connector having a lowermost end portion having a lowermost surface which faces said uppermost end portion of said armature, said lowermost end portion of said fuel inlet connector having a plurality of radially extending grooves separated by a corresponding plurality of radially extending raised pads to reduce the effective contact surface area between said inlet connector and said armature and to permit fuel to flow from said fuel inlet connector across said working gap;

e) a magnetic coil system having a magnetic solenoid coil for moving said armature and said valve closing element away from said fixed valve seat and toward said fuel inlet connector when said magnetic coil system is energized so as to permit fuel to flow through said fixed valve seat;

f) a resilient device to bias said armature and said valve closing element to move toward said fixed valve seat when said magnetic coil system is deenergized;

g) at least one first aperture extending through a wall portion of said armature for receiving fuel flow from said fuel inlet connector and directing said fuel flow from said generally elongated central opening of said armature toward said fixed valve seat, said at least one aperture being generally transverse to the longitudinal axis;

h) at least one second aperture extending through a wall portion of said armature for receiving fuel flow from said inlet connector and directing said fuel flow toward said fixed valve seat, said second aperture being oriented at a generally acute angle relative to the longitudinal axis for directing fuel from said generally central opening outwardly of said armature and downwardly toward said fixed valve seat; and i) a thermally conductive material positioned adjacent said magnetic coil and surrounding at least a portion of said fuel inlet connector for conducting heat from said magnetic coil to adjacent components.

\* \* \* \* \*